United States Patent Office 3,769,221
Patented Oct. 30, 1973

3,769,221
FUNCTIONAL FLUID COMPOSITIONS
Merwyn L. Burrous, El Cerrito, Calif., assignor to Chevron Research Company, San Francisco, Calif.
No Drawing. Filed Jan. 17, 1972, Ser. No. 218,544
Int. Cl. C09k 3/00
U.S. Cl. 252—78   5 Claims

ABSTRACT OF THE DISCLOSURE

Nonflammable functional fluid compositions, which are compatible with a variety of elastomers, in that they do not produce excessive swelling or shrinkage, are formed from mixtures in all proportions of oxaalkyl phosphate esters, including mixed oxaalkyl-alkyl phosphate esters, and mixed oxaalkyl-p-alkoxyphenyl phosphate esters, with alkyl, aryl, or mixed alkyl-aryl phosphate esters.

BACKGROUND OF THE INVENTION

Field of the invention

In the last few decades the introduction of a host of synthetic rubbers, or elastomers, has permitted the construction of tough, resistant and stable seals and packings for hydraulic systems, automatic transmissions, pumps, and other equipment utilizing functional fluids.

An elementary hydraulic system, for example, comprises a pair of cylinders connected by a conduit containing hydraulic fluid. When the fluid is acted upon by a piston in one of the cylinders, the fluid transmits a force to a piston in the other cylinder which serves to actuate brakes, control surfaces in aircraft, landing gear and other mechanical devices. Hydraulic systems contain seals and packings which are in contact with the fluid. Seals and packing will often be composed of a rubbery material which is a synthetic elastomer. These elastomers go by various trade names, such as neoprene (chloroprene rubber), Buna N (copolymer of butadiene and acrylonitrile), Viton (vinylidene fluoride-hexafluoropropylene copolymer), and Butyl (isobutyleneisoprene copolymer). Other useful elastomers include the ethylenepropylene copolymers, silicone rubber, fluorosilicone rubber, and polynitrile.

It is well known that most functional fluids are more or less incompatible towards one or more of these elastomers. Specifically, the ordinary phosphate esters, which have achieved great popularity as aircraft hydraulic fluid bases, cause excessive swelling of most of the above-named elastomers with the single general exception of ethylene-propylene copolymer. The functional fluid may cause either excessive swelling, or shrinkage, with consequent damage to the mechanical system through loss of fluid, disintegration of the seals and packing, or excessive friction and wear. For satisfactory service, the amount of swelling of the elastomer should be kept to approximately 20 volume percent or less.

The problem of elastomer swelling can be solved by replacing the seals and packing with a resistant elastomer such as ethylene-propylene copolymer, but this is prohibitively expensive in a fleet of any size. The expense is due not only to the actual replacement cost, but also the nonproductive downtime incurred on expensive aircraft and equipment.

While the capability of not causing excessive elastomer swell or shrinkage is a valuable characteristic, the functional fluid must also possess other characteristics; these include, adequate lubricity, non-flammability, non-corrosiveness, suitable viscosity characteristics, stability, low toxicity, low cost, resistance to oxidation and resistance to hydrolysis. Coupling all these properties with compatibility towards a variety of elastomers is a difficult achievement for a functional fluid. The elastomers cover such a wide range in ability to hydrogen bond, dipole moment and thermodynamic properties that only a few fluids, such as water, are known to be satisfactorily compatible with all the cited elastomers. Binary or ternary mixtures of fluids offers a means of combining the advantages and defects of several fluids so as to maximize overlap with the desired characteristics.

In recent years, the swelling of seals by phosphate ester fluids in landing gear hydraulic systems, causing the gears to jam, has threatened to ground certain commercial aircraft. Fortunately, ethylene-propylene copolymer seals became available at this critical time. It is an object of this invention to find a phosphate fluid mixture which retained all of the well-known advantages and properties of the phosphate esters as hydraulic fluids, but is compatible with a variety of elastomeric materials of which superior seals and packings may be made. It is found that mixtures of the ordinary phosphate esters with oxaalkyl phosphate esters and/or mixed oxaalkyl-alkyl phosphate esters and mixed oxaalkyl-p-alkoxyphenyl phosphate esters succeed in achieving this goal.

While the trialkyl, triaryl or mixed alkyl-aryl phosphates, either alone or in combination, cause considerable swelling of these synthetic rubber materials now currently usable in hydraulic systems and other functional fluid systems, we have found that this swelling effect is materially reduced and brought within manageable limits for a variety of elastomers without markedly impairing the inherently superior temperature, viscosity and flammability characteristics of the phosphate base fluid, by combining therewith one or more oxaalkyl phosphate esters. Other known functional fluid additives, such as, viscosity index improvers, anti-foamants and corrosion inhibitors, can also be present in the fully compounded fluid. The oxaalkyl phosphate esters can also serve as viscosity index improvers and anti-wear agents in functional fluids and lubricants.

Prior art

Alkoxypolyoxyalkylene mono-, di-, and tri-esters of phosphoric acid have been proposed as lubricants and hydraulic fluids, e.g., tributyl carbityl phosphate, U.S. Pat. 2,723,237, and alkylene glycol monoalkyl ether phosphate, U.S. Pat. 2,750,342. The alkyl-aryl and alkaryl triesters of phosphoric acid are well-known functional fluids, e.g., U.S. Pats. 2,636,861; 2,636,862; 2,894,911; 2,903,428; and 3,036,012. A hydraulic base fluid comprising a mixture of one or more trialkylphosphates and an aliphatic polyhydric alcohol has been suggested in U.S. Pat. 2,659,699 to be acceptably compatible with certain Buna N-neoprene seals.

SUMMARY OF THE INVENTION

The novel functional fluids of this invention comprise the combination, in the nature of a mixture or blend, of one or more alkyl, aryl, alkaryl and/or aralkyl triesters of phosphoric acid, such as, tricresyl phosphate or tri-n-butyl phosphate, with one or more oxaalkyl and/or p-alkoxyphenyl esters of phosphoric acid. Alternatively, the only ester of phosphoric acid present may be the latter esters.

Specifically, the functional fluid comprises from 10–100 percent by weight of oxaalkyl and/or p-alkoxyphenyl ester of phosphoric acid, which is compatible with a variety of synthetic elastomers and serves to prevent or inhibit the excessive swelling of elastomer seals and packings. The remainder may be in major proportion to other triesters of phosphoric acid, such as tri-n-butyl phosphate and/or tricresyl phosphate, and minor proportions of functional additives, such as anti-foamants, corrosion inhibitors and viscosity index improvers.

The ester moieties of the oxaalkyl phosphates are derived from oxaalkanols of molecular weight in the range from about 50 to about 650 which are produced by the successive condensation of ethylene oxide and/or propylene oxide with an alkanol to the extent of 1 to about 20 or more oxide units. The ester moieties of the p-alkoxyphenyl phosphates are derived from p-alkoxyphenols of molecular weight in the range from about 100 to about 300. The oxaalkyl phosphates and p-alkoxyphenyl phosphates show a superior compatibility with a variety of elastomeric materials. Consequently, either singly or in combination with other phosphate esters, they form an exceptional base stock for functional fluids which must meet the service requirements of systems containing seals and packings made from elastomeric material.

DESCRIPTION OF THE INVENTION

Phosphate esters of oxaalkanols

The oxaalkyl phosphates of this invnetion may be oxaalkyl phosphate monoesters, oxaalkyl phosphate diesters or oxaalkyl phosphate triesters, but in each case the phosphate is a triester. That is, an oxaalkyl phosphate monoester is a triester with one oxaalkyl ester moiety and two alkyl, aryl, alkaryl and/or p-alkoxyphenyl ester moieties. Similarly, an oxaalkyl phosphate diester contains two oxaalkyl ester moieties and one alkyl, aryl, alkaryl or p-alkoxyphenyl ester moiety. Thus, the oxaalkyl phosphate esters of this invention are expressed by the general formula:

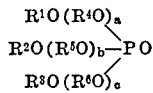

wherein the subscripts $a$, $b$, and $c$ are integers equal to 0–20, $a+b+c$ is at least 2, $R^4$, $R^5$ and $R^6$ are respectively selected from the group of divalent radicals consisting of ethylene, propylene and phenylene, with the proviso that in the case of phenylene the subscript $a$, $b$, or $c$ is equal to 1, and $R^1$, $R^2$ and $R^3$ are respectively alkyl aryl, alkaryl or aralkyl radicals of from 1 to 12 carbon atoms. The use of the prefix "oxa-" is convenient for naming long alipahtic chains containing oxygen atom interruptors. The "oxa-" names are derived from the name of the corresponding aliphatic hydrocarbon by prefixing "oxa-" to it.

The oxaalkyl phosphates of this invention are derived from oxaalkanols and p-alkoxyphenols as well as substituted alkanols and substituted phenols. In an alternative and less concise nomenclature these oxaalkanols are polyoxyalkylene ethers of aliphatic alcohols of from 1 to 12 carbon atoms, such as, polyoxyethylene ether of methanol:

$$CH_3O[CH_2CH_2O]_nH$$

or polyoxypropylene ether of methanol:

or the block copolymer polyoxyethylene - polyoxypropylene ether of methanol:

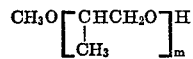

wherein $n+m+o$ in these examples will vary from 1 to about 70, and preferably, for reasons of specific gravity and viscosity, will range from 1 to about 20.

Phenols and alkyl phenols, like the above aliphatic alcohols, may be similarly polyoxyalkylated and their phosphate esters may find use as functional fluids, lubricants and additives thereto.

The oxaalkanols and polyoxyalkylated phenols contemplated above as precursors for the phosphate esters are well-known products of the corresponding alkylene oxides and aliphatic alcohols or phenols as disclosed, for example, in U.S. Pats. 2,213,477; 2,174,761; and 2,674,619.

The triesters of phosphoric acid may be synthesized by slowly contacting about 3 moles of a suitable oxaalkanol, or mixture of same in amounts totalling 3 moles of alcohol, or phenol, with 1 mole of a phosphoric acid generating substance such as phosphorus oxychloride, at about room temperature, in the presence of a suitable medium such as benzene, refluxing the mixture, and separating. When phosphorus oxychloride is employed, it may be advantageous to provide a basic substance to absorb the hydrogen chloride produced in the reaction.

The mono- and diesters of oxyalkanols and phosphoric acid are prepared by the reaction of 1 mole of $POCl_3$ with 1 to 2 moles of the oxaalkanol. The triester phosphate of this invention is produced by subsequent reaction of this product (oxaalkyl phosphorochloride) with alkanol, phenol, or p-alkoxyphenol or the respective alkali metal salts of these compounds.

Phosphate esters

Other phosphate esters which are the preferred ingredients of the present composition have the formula:

wherein $R^7$, $R^8$ and $R^9$ each represent an alkyl, aryl, alkaryl, or aralkyl hydrocarbon group. All three groups may be the same, all three different, or two groups may be alike and the third different. A typical fluid will contain at least one species of phosphate ester and usually will be a mixture of two or more species of phosphate esters.

These phosphate esters will each have a total carbon content of 3–36 carbon atoms. Individual alkyl groups will usually have 1–12 carbon atoms, while individual aryl groups will usually have 6–12 carbon atoms. Preferred esters contain 12–24 total carbon atoms, preferred alkyl groups, 4–6 carbon atoms, and preferred aryl groups, 6–9 carbon atoms. The alkyl groups may be straight- or branched-chain, with straight-chain such as n-butyl preferred. Similarly, the alkyl substituents in aryl structures may also be straight- or branched-chain. Generic examples of the phosphate esters include trialkyl phosphates, triaryl phosphates and mixed alkyl-aryl phosphates. Specific examples include trimethyl phosphate, tributyl phosphate, dibutyl-octyl phosphate, triphenyl phosphate, phenyldicresyl phosphate, tricresyl phosphate, etc.

Additives

The power transmission fluids of the present invention generally contain a number of additives which in total comprise 5–25 weight percent of the finished fluid. Among these is water, which may be added intentionally, or often becomes incorporated into the fluid unintentionally. Hydrolysis inhibitors to retard corrosion are often added to hydraulic fluids. They include various epoxides such as the glycidyl ethers described in U.S. Pat. 2,636,861. Typical epoxide compounds which may be used include glycidyl methyl ether, glycidyl isopropyl ether, styrene oxide, ethylene oxide, and epichlorohydrin. Hydrocarbyl sulfides, especially disulfides, such as dialkyl disulfide are often used in combination with the epoxide compounds for additional corrosion suppression. Typical hydrocarbon disulfides include benzyl disulfide, butyl disulfide, and diisoamyl disulfide. A particularly preferred class of epoxide hydrolysis inhibitors are those containing two linked cyclohexane groups to each of which is fused an epoxide (oxirane) group. Illustrative are those in which the linking structure contains a carboxylic acid ester group.

The hydraulic fluid normally contains 2–10 weight percent preferably 5–10 weight percent, of one or more viscosity index improving agents such as alkyl styrene polymers, polymerized organic silicones, or preferably polyisobutylene or the polymerized alkyl esters of the acrylic acid series, particularly acrylic and methacrylic acid esters. These polymeric materials generally have a number average molecular weight of from about 5,000 to 300,000. However, it is within the scope of the present invention to utilize the oxaalkyl phosphate esters themselves as viscosity index improving agents, thus eliminating the need for the polymers in the hydraulic fluid composition.

Other specific additives are combined with the base stock to impart particular properties. For example, anti-wear agents, anti-oxidants, rust inhibitors, and anti-foamants as well as hydrolysis suppressants and viscosity index improvers may be added in small percentages.

Hydraulic fluids

The hydraulic fluid bases of the present invention comprise a substantial amount of oxaalkyl phosphate as an elastomer compatible component or additive. In one embodiment of this invention, from 10 to 45 percent by weight of the total fluid base is composed of oxaalkyl phosphate esters, as heretofore described, to inhibit the swelling of elastomer seals and packing. In which case, the major proportion of the fluid base can be an amide of phosphoric acid, an alkyl, aryl, alkaryl or aralkyl ester of phosphoric acid, or physical, or chemical combination of these as heretofore described, a silicon, a silicate ester, a polyphenyl ether, or a hydrocarbon.

In another embodiment of this invention, the oxaalkyl phosphate, heretofore described, composes 45 to 100 percent by weight of the hydraulic fluid base and the remainder is an alkyl, aryl, alkaryl, or aralkyl phosphate ester, or physical, or chemical combination of these as heretofore described. The higher percentage of oxaalkyl phosphate ester can permit compatibility with, for example, Buna N elastomer, which suffers extreme swelling when contacted with tricresyl phosphate or tri-n-butyl phosphate. The remainder of the finished hydraulic fluid is in all embodiments composed of a minor amount of the additives previously discussed.

EXAMPLES

The following are typical examples of functional fluids embodying this invention and are only intended for purposes of illustration.

Example 1

| A blend of | Weight percent |
|---|---|
| Tricresyl phosphate | 25 |
| Tributyl phosphate | 50 |
| $(CH_3OCH_2CH_2O)_2PO(O\phi)$ | 25 |

Example 2

| A blend of | Weight percent |
|---|---|
| Triethyl phosphate | 33 |
| $(CH_3OCH_2CH_2O)PO(O\phi OCH_2)_3$ | 67 |

Example 3

| A blend of | Weight percent |
|---|---|
| Cresyl diphenyl phosphate | 15 |
| $(CH_3OCH_2CH_2O)_2PO(O\phi)$ | 85 |

Example 4

| A blend of | Weight percent |
|---|---|
| Tributoxyethyl phosphate | 50 |
| $(CH_3OCH_2CH_2O)_3PO$ | 50 |

Example 5

| A blend of | Weight percent |
|---|---|
| $(CH_3OCH_2CH_2OCH_2CH_2O)_3PO$ | 40 |
| $(CH_3OCH_2CH_2O)PO(O\phi OCH_3)_2$ | 60 |

Example 6

| A blend of | Weight percent |
|---|---|
| Polyoxyalkylene glycol diether | 25 |
| $(CH_3OCH_2CH_2O)PO(O\phi OCH_3)_2$ | 75 |

Example 7

| A blend of | Weight percent |
|---|---|
| Di 2-ethylhexyl sebacate | 80 |
| $(CH_3OCH_2CH_2O)PO(O\phi OCH_3)_2$ | 20 |

TABLE I

| Phosphate fluid component | Elastomer swell. volume percent | | | | | |
|---|---|---|---|---|---|---|
|  | CR | NI | EPR | NBR | FPM | FVSi |
| $(n-C_6H_{13}OCH_2CH_2O)_3PO$ |  |  | 11.6 |  |  |  |
| $(C_2H_5(OCH_2CH_2)_2O)_3PO$ | 10.6 |  | −1.8 |  | D |  |
| $(n-C_4H_9O)_2PO(OCH_2CH_2OC_4H_9)$ |  |  | 8 |  |  |  |
| $(CH_3(OCH_2CH_2)_2O)_3PO$ | −6.6 | 11.7 |  | 38 | 231 | −3 |
| $(CH_3(OCH_2CH_2)_2O)_3PO$ | −2 |  |  |  | 114 |  |
| $(C_3H_7OC_3H_6O)_3PO$ | 75 |  | 22 |  |  |  |
| $(CH_3O)PO(OCH_2CH_2OCH_3)_2$ | 27 |  |  | 43 |  |  |
| $(CH_3OCH_2CH_2O)_2PO(O\phi)$ | 4.8 | 39 | 1 | 66 | 31 | 3.8 |
| $(CH_3OCH_2CH_2O)_2PO(O\phi OCH_3)$ | 1 | 21 |  | 20 | 22 | 3.6 |
| $(CH_3OCH_2CH_2O)PO(O\phi OCH_3)_2$ | 0.9 |  |  | 35 | 3.5 | 1.1 |
| Tricresyl phosphate (TCP) |  |  |  | 190 |  |  |
| $(n-C_4H_9O)_3PO$ (TBP) | 138 |  | 10 | 134 | 430 |  |
| Hydraulic fluid [90% TBP + 10% TCP] |  |  | 8 |  |  |  |
| $(n-C_4H_9O)_2PO(O\phi)$ | 85 | 146 | 3 |  | 325 | 33 |

NOTE: D=Disintegration; CR=Neoprene (polydichloroprene rubber); NI=Polynitrile; EPR=Ethylene-propylene copolymer rubber; NBR=Buna N (nitrile-butadiene rubber); FPM=Viton (vinylidene fluoride-hexafluoropropylene copolymer); FVSi=Fluorosilicone rubber.

The table illustrates the superior compatibility of the oxalkyl phosphates with a variety of elastomeric materials. The table also illustrates the failure of the ordinary alkyl and aryl phosphates in their deleterious effect on elastomeric materials other than ethylene-propylene copolymer. Not that the phosphate esters are alone in this deleterious effect on, for example, Buna N; aniline, benzene, benzaldehyde, butyl acetate, butyl amine, chlorobromomethane, chloroform, cyclohexanone, dichloro ethylene, diethyl sulfate, dioxane, diphenyl, ethyl chloroformate, ethylene dichloride, methylene dichloride, nitrobenzene, dichloro benzene, pyridine, tetrachloroethane, styrene, carbolic acid, cresylic acid, diacetone alcohol, furfural alcohol, benzyl alcohol, and chlorobenzene are but some of the fluids which cause Buna N to swell more than 100 percent. A similar long and partially non-overlapping list of fluids could be made which are characterized by their ability to swell Butyl rubber more than 100 percent. Similar lists can be made for other elastomers. Thus, the discovery of a fluid such as

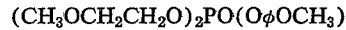

$(CH_3OCH_2CH_2O)_2PO(O\phi OCH_3)$ which does not appreciably swell a variety of elastomers, as seen in the table, is extremely important in the art of functional fluid formulation. While the oxaalkyl phosphate esters remain superior fluids in their compatibility with ethylene-propylene copolymers, like the ordinary phosphate esters, they are shown to be compatible with at least one other class of elastomers in each case, and often are compatible with several classes of elastomers.

The concentration or proportion of the oxaalkyl phosphate employed in the hydraulic fluids of the present invention depends to a large extent upon the particular alkyl phosphate, oxaalkyl phosphate or other fluid that is used as the base or stock material for the hydraulic fluid. Most especially, it depends upon the particular elastomer with which compatibility is desired. As seen in the table, different fluids will be more or less compatible toward different elastomers even when these fluids are structurally closely related. The fluids of this invention are nonflammable for all practical purposes and have satisfactory lubricity characteristics. As described above, the preferred fluids of this invention do not cause excessive swelling of the synthetic elastomer seals and packing of hydraulic systems and other functional fluid utilizing systems.

The above data and examples are intended to be illustrative. The scope of the invention is to be considered limited only by the following claims. It is understood, that if desired, other materials may be added to the compositions of matter herein claimed without departing from the spirit of the invention. In particular, it is understood that in said claims components recited in the singular are intended to include compatible mixtures of said components wherever the sense permits.

I claim:

1. A nonflammable hydraulic fluid having improved elastomer compatibility consisting essentially of a major amount by weight of an ester of phosphoric acid having the general formula:

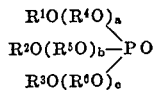

wherein the subscripts $a$, $b$, and $c$ are integers having a value from 0 to 20, $a+b+c$ is at least 2, $R^4$, $R^5$, and $R^6$ are respectively selected from the group of divalent radicals consisting of ethylene, propylene and phenylene, with the proviso that in the case of phenylene the subscript $a$, $b$, or $c$ is equal to 1, and $R^1$, $R^2$, and $R^3$ are respectively alkyl, aryl, alkaryl, or aralkyl radicals of from 1 to 12 carbon atoms; a minor amount by weight of a phosphate ester of the general formula $(R^7R^8R^9)O_3PO$, wherein $R^7$, $R^8$, and $R^9$ are respectively alkyl, aryl, alkaryl, or aralkyl radicals of from 1 to 8 carbon atoms; and less than 25 weight percent of epoxide hydrolysis inhibitors.

2. A nonflammable hydraulic fluid according to claim 1, wherein $R^1$, $R^2$, and $R^3$ are respectfully chosen from the group consisting of methyl, ethyl, propyl and butyl, and $a+b+c$ has a value in the range from 2 to 10.

3. A nonflammable hydraulic fluid having improved elastomer compatibility comprising from 25 to 85 percent by weight of an oxaalkanol phosphate ester chosen from the group consisting of:

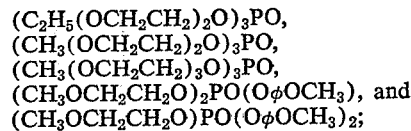

and from 75 to 15 percent by weight of a phosphate ester of the general formula $(R^7R^8R^9)O_3PO$, wherein $R^7$, $R^8$, and $R^9$ are respectively alkyl, aryl, alkaryl, or aralkyl radicals of from 1 to 8 carbon atoms.

4. A nonflammable hydraulic fluid having improved elastomer compatibility consisting essentially of a major amount by weight of an ester of phosphoric acid having the general formula:

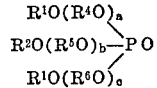

wherein the subscripts $a$, $b$, and $c$ are integers having a value from 0 to 20, $a+b+c$ is at least 2, $R^4$, $R^5$, and $R^6$ are respectively selected from the group of divalent radicals consisting of ethylene, propylene and phenylene, with the proviso that in the case of phenylene the subscript $a$, $b$, or $c$ is equal to 1, and $R^1$, $R^2$, and $R^3$ are respectively alkyl, aryl, alkaryl, or aralkyl radicals of from 1 to 12 carbon atoms; a minor amount by weight of a phosphate ester of the general formula $(R^7R^8R^9)O_3PO$, wherein $R^7$, $R^8$, and $R^9$ are respectively alkyl, aryl, alkaryl, or aralkyl radicals of from 1 to 8 carbon atoms; and less than 25 weight percent of polymeric viscosity index improvers.

5. A nonflammable hydraulic fluid having improved elastomer compatibility consisting of essentially of a major amount by weight of an ester of phosphoric acid having the general formula:

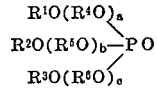

wherein the subscripts $a$, $b$, $c$ are integers having a value from 0 to 20, $a+b+c$ is at least 2, $R^4$, $R^5$, and $R^6$ are respectively selected from the group of divalent radicals consisting of ethylene, propylene and phenylene, with the proviso that in the case of phenylene the subscript $a$, $b$, or $c$ is equal to 1, and $R^1$, $R^2$, and $R^3$ are respectively alkyl, aryl, alkaryl, or aralkyl radicals of from 1 to 12 carbon atoms; a minor amount by weight of a phosphate ester of the general formula $(R^7R^8R^9)O_3PO$, wherein $R^7$, $R^8$, and $R^9$ are respectively alkyl, aryl, alkaryl, or aralkyl radicals of from 1 to 8 carbon atoms; and less than 25 weight percent of hydrocarbyl sulfide corrosion suppressants.

References Cited

UNITED STATES PATENTS

| Patent No. | Date | Name | Class |
|---|---|---|---|
| 2,659,699 | 11/1953 | George et al. | 252—78 |
| 2,723,237 | 11/1955 | Ferrin | 252—49.8 |
| 2,750,342 | 6/1956 | Mikeska et al. | 252—46.6 |
| 3,061,506 | 10/1962 | Nunn et al. | 260—950 X |
| 3,074,889 | 1/1963 | Attwood | 252—78 |
| 3,340,191 | 9/1967 | White et al. | 252—49.8 |
| 3,513,097 | 5/1970 | Langenfeld | 252—78 |
| 3,203,896 | 8/1965 | Latos et al. | 252—75 X |

LEON D. ROSDOL, Primary Examiner

H. A. PITLICK, Assistant Examiner

U.S. Cl. X.R.

252—49.8, 49.9